Nov. 10, 1942.   H. E. AXEL   2,301,655
BUTTON SAW
Filed Oct. 16, 1941
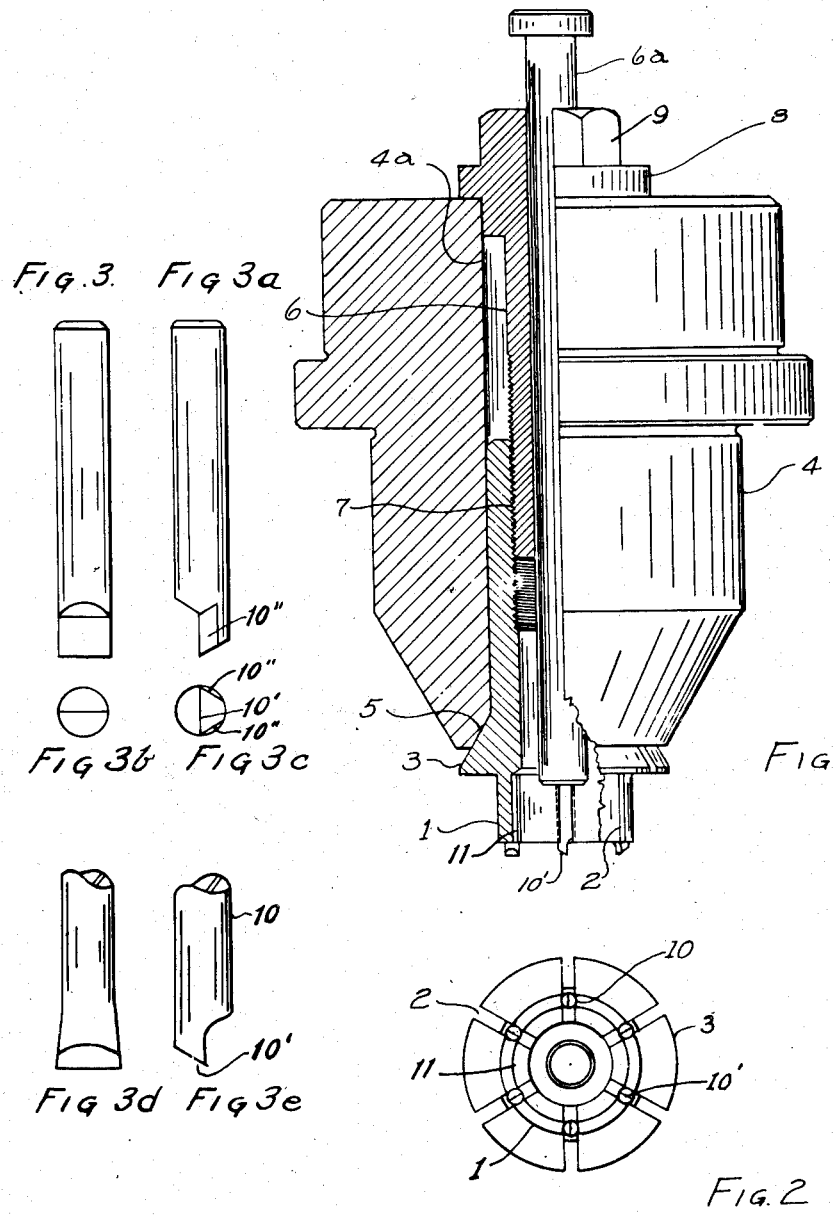
INVENTOR.
Harold E. Axel,
BY Bush & Bush,
ATTORNEYS.

Patented Nov. 10, 1942

2,301,655

UNITED STATES PATENT OFFICE 2,301,655

BUTTON SAW

Harold Elwood Axel, Muscatine, Iowa

Application October 16, 1941, Serial No. 415,182

12 Claims. (Cl. 77—69)

My invention relates to improvements in button saws, but is applicable to cutters for many other uses.

The objects of my invention are to provide an improved type of tubular crown saw having durable teeth that will last indefinitely and permit operation for long periods without re-sharpening, that can be readily sharpened when necessary or easily replaced; to provide means which will permit the use of small rods of tungsten-carbide or other hard and more or less fragile metals or alloys as teeth or cutters, and which will protect such teeth against breakage while holding them securely locked in their adjusted positions; to provide teeth or cutters which will form smooth peripheries upon the buttons and not require refinishing and which will operate satisfactorily on shells of all kinds as well as upon various metals, plastics and other materials and which may be used to cut cylindrical objects of various kinds as well as buttons. Other objects will appear from the description.

In the manufacture of shell buttons, tubular crown saws have been in common use. Such saws have commonly been made of steel and when so made, require re-sharpening every few minutes, as well as leaving lines or tool marks upon the peripheries of the button blanks which require polishing off or refinishing. Saws having teeth made of tungsten carbide have also been used and such teeth are more durable than steel, but great difficulty has been experienced because of breakage, such teeth being more or less fragile and it being difficult to mount them in a form that would protect them from breakage.

I overcome these difficulties by providing for the use of rod-like teeth or cutters formed of tungsten-carbide or formed of steel with tungsten-carbide tips united thereto, adjustably mounted in tubular holders which practically surround the rods and afford firm support for them upon all sides with only a minimum amount projecting beyond the holder, which projection is sharpened to form the cutting edges of the teeth.

I accomplish my objects by the means illustrated in the accompanying drawing, in which—

Figure 1 is a vertical half-sectional view of my saw completely assembled;

Figure 2 is a plan view looking upwardly from the bottom of Figure 1;

Figures 3, 3a, 3b, 3c, 3d, and 3e show enlarged detail views of the tungsten-carbide rods or cutters in several positions.

Similar numerals refer to similar parts throughout the several views.

It will be understood that these saws or cutters can be made in various sizes.

My appliance comprises a body or holder 4 of cylindrical form, but of varying diameter, provided with a bore 4a the internal diameter of which is equal to the outside diameter of the saw tube 1. The bore at the lower end of the block 4 is beveled and this beveled portion forms a seat for a frustum 3 formed integral with the saw tube 1.

The saw tube 1 is provided with a plurality of longitudinal slots 2 extending down to the lower end thereof and these slots 2 extend through the frustum 3.

The lower ends of the slots 2 are bored out to form slotted tubes adapted to fit and hold the cutter bars or teeth 10. The bores and the teeth 10 have a diameter somewhat larger than the diameter of the slots 2 and the tubes will form a firm support for the rods 10 when the lower end of the saw tube 1 is contracted.

The opposite end of the saw tube 1 is provided with a bore 7 threaded to receive a bolt 6 formed integral with a block 8 and head 9. When the bolt 6 is screwed into the bore 7, the block 8 will contact the upper end of the body 4 and as the bolt 6 is turned, it will draw the saw tube 1 into the body 4 causing the beveled seat 5 to press upon the frustum 4 thereby contracting the frustum and the lower end of the saw tube 1 and binding the rods 10 firmly in place in their respective bores.

The bolt 6 may be hollow and provided with a rod 6a slidingly mounted therein, which rod may be utilized to push out the button after it is cut. Such pusher means are in common use and I make no claim to such pusher separately.

The rods 10 are preferably formed of tungsten-carbide, a material noted for its exceeding hardness, but also somewhat brittle. The lower end of the rod 10 is ground away through approximately one-half its thickness, leaving a very short tooth projecting therefrom which is beveled on one side to form a chisel edge 10'. The sides of the teeth 10' may also be beveled as at 10" to form lateral cutting edges if desired, but in general, such lateral cutting edges will not be necessary.

The chisel edge 10' may be of a length corresponding to the diameter of the rod 10 or it may be widened slightly so as to provide a cut having a diameter slightly wider than the diameter of the rods 10, but various forms for this chisel edge may be utilized without departing from the spirit of my invention.

When the rods or cutters 10 are formed of tungsten-carbide, this form of apparatus may be utilized to cut steel or any of the softer metals, and rods or cutters of extremely hard steel or various alloys may be utilized to cut plastics and softer metals. Likewise, other alloys may be developed or utilized which may be equal or superior to tungsten-carbide and I do not limit my claims to the use of tungsten-carbide except when expressly mentioned therein.

In case the chisel edge 10' becomes worn or broken, a new edge may be ground upon the rod and the rods can readily be adjusted by utilizing a gauge to measure the projection of the tooth beyond the saw tube with the bolt 6 tightened sufficiently to prevent accidental displacement. Then when all the rods have been adjusted to the desired position, the bolt 6 can be tightened so as to lock all of the rods firmly in place. The chisel edges 10' are intended to extend on radial lines from the center of the saw tube 1 and when properly formed and adjusted, will make extremely smooth cuts so that the blanks cut thereby will not require reworking on the edges to remove lines and tool marks as is necessary with the saws now in common use.

The lower end of the saw tube 1 is bored out with a bore 11 which extends upwardly into the tube far enough to accommodate shells of the thicknesses being operated upon and may be varied in depth to meet the requirements of different cases.

I prefer to provide the walls of the lower end of the saw tube 1 with a thickness of approximately one-sixteenth of an inch and to form the teeth or cutters 10 having a diameter slightly in excess of one-sixteenth of an inch so that the cutters will cut annular channels having a width of approximately one-sixteenth of an inch, but I do not limit my claims to any specified size or proportions.

In the use of my apparatus, the saw tube 1 is inserted in the bore 4a of the body 4. The bolt 6 is then screwed into the bore 7 of the saw tube and turned until the frustum 3 is brought into contact with the seat 5 and tightened enough so that the bores in the lower end of the saw tube 1 will fit snugly upon the rods 10. The rods are then adjusted so that the chisel edge 10' projects a very short distance beyond the end of the saw tube 1. The bolt 6 is then tightened until the rods 10 are locked firmly in position. The rod 6a is then put in place and the entire assembly mounted in the usual way in the button-cutting machine.

It is obvious that many changes in form, size, proportions and materials utilized may be made without departing from the spirit of my invention and I do not limit my claims to the precise forms, proportions and materials described or shown in the drawing.

I claim:

1. A button saw comprising a revolvable body with a longitudinal central bore formed therein, having a beveled annular seat at one end of the bore, a tubular carrier mounted within the bore slidable longitudinally therein and having an external frustum united thereto seatable in the beveled seat, a plurality of longitudinal slots formed in the carrier and frustum extending to one end of the carrier, each slot having a longitudinal seat formed therein at its outer end, cutter bars adjustably mounted in the seats of the slots respectively, each cutter bar having a cutting tooth formed upon the outer end thereof, a threaded bore formed in the opposite end of the carrier, and a bolt mounted in said threaded bore having a projecting head to bear against the adjacent end of the body whereby the carrier may be drawn into the body and the frustum caused to wedge against the beveled seat thereby contracting the slotted end of the carrier and securing the cutter bars against displacement.

2. In a button saw, the combination with a revolvable outer wedge member, of an inner wedge member mounted therein having a plurality of bores formed in the inner member at one end thereof, rods mounted in the bores respectively, each rod having a cutting tooth formed thereon, and means whereby the inner member may be drawn into the outer member arranged to cause the wedging action thereof when so drawn to contract the bores upon the rods and lock them securely in adjusted positions therein.

3. A button saw comprising a cylindrical body with a longitudinal central bore formed therein, having an internally beveled seat, a cutter bar holder mounted within the bore slidable longitudinally therein having united thereto an externally beveled wedge-member arranged to co-act with the beveled seat, a plurality of longitudinal slots formed in the holder, each slot having a longitudinal bore formed therein at its outer end, cutter bars adjustably mounted in the bores of the slots respectively, each bar carrying a cutting tooth at the outer end thereof, a threaded bore formed in the opposite end of the carrier, a bolt mounted in said threaded bore having a projecting head to bear against the adjacent end of the body whereby the wedge-members may be drawn together to contract the slotted end of the carrier and secure the bars firmly in the holder.

4. A button saw as described in claim 3, the beveled seat being located at one end of its bore.

5. A button saw as described in claim 3, the beveled seat being located near the end of its bore.

6. A button saw comprising a body with a longitudinal central bore formed therein, having an internally beveled seat at one end of the bore, a contractable holder mounted within the bore slidable longitudinally therein and having united thereto an externally beveled wedge-member arranged to co-act with the beveled seat, a plurality of longitudinal slots formed in the holder, each slot having a longitudinal bore formed therein at its outer end, cutting means adjustably mounted in the bores of the slots respectively, having cutters formed upon the outer ends thereof, and means mounted in the opposite end of the carrier whereby the carrier may be drawn into the body to cause it to wedge against the beveled seat to contract the slotted end of the carrier and secure the cutting means in fixed position in their respective bores.

7. A button saw comprising a body with a longitudinal central bore formed therein, having an internally beveled seat at one end of the bore, a contractable holder mounted within the bore slidable longitudinally therein and having united thereto an externally beveled wedge-member arranged to co-act with the beveled seat, a plurality of longitudinal slots formed in the holder, each slot having a longitudinal bore formed therein at its outer end, cutting means mounted in the bores of the slots respectively, having cutters formed upon the outer ends thereof, and means mounted in the opposite end of the carrier whereby the carrier may be drawn into the body to cause it to wedge against the beveled seat to contract the slotted end of the carrier and secure the cutting means in fixed position in their respective bores.

8. A tubular crown saw comprising a cylindrical body with a longitudinal central bore formed therein, having an internally beveled seat, a cutter bar holder mounted within the bore slidable longitudinally therein having united thereto an externally beveled wedge-member arranged to co-act with the beveled seat, a plurality of longitudinal slots formed in the holder, each slot having a longitudinal bore formed therein at its outer end, cutter bars adjustably mounted in the bores of the slots respectively, each bar carrying a cutting tooth at the outer end thereof, a threaded bore formed in the opposite end of the carrier, and a bolt mounted in said threaded bore having a projecting head to bear against the adjacent end of the body whereby the wedge-members may be drawn together to contract the slotted end of the carrier and secure the bars firmly in the holder.

9. In a button saw the combination with a body having a longitudinal central bore formed therein, having an internally beveled seat at one end of the bore, of a contractable holder mounted within the bore slidable longitudinally therein and having united thereto an externally beveled wedge-member arranged to co-act with the beveled seat, a plurality of longitudinal slots formed in the holder, each slot having a longitudinal bore formed therein at its outer end, cutting means adjustably mounted in the bores of the slots respectively, having cutters formed upon the outer ends thereof, and means mounted in the opposite end of the carrier whereby the carrier may be drawn into the body to cause it to wedge against the beveled seat to contract the slotted end of the carrier and secure the cutting means in fixed position in their respective bores.

10. In a button saw, the combination with a revolvable outer wedge-member, of an inner wedge-member mounted therein having a plurality of slotted bores formed at one end thereof, rods mounted in the bores respectively each rod having a cutting tooth formed thereon, and means whereby the inner member may be drawn into the outer member arranged to cause the wedging action thereof when so drawn to secure the inner and outer members against movement relative to each other and to contract the bores upon the rods and secure them in fixed adjusted positions therein.

11. In a button saw, the combination with a revolvable outer wedge-member, of a slotted tubular inner wedge-member mounted therein having a plurality of slotted bores formed at one end thereof, rods mounted in the bores respectively each rod having a cutting tooth formed thereon, and means whereby the inner member may be drawn into the outer member arranged to cause the wedging action thereof when so drawn to secure the inner and outer members against movement relative to each other and to contract the bores upon the rods and secure them in fixed adjusted positions therein.

12. In a button saw, the combination with a revolvable outer wedge-member, of an inner wedge-member mounted therein having a plurality of longitudinal slotted bores formed in the outer end thereof, cutter bars mounted in the bores respectively, each bar having a cutting tooth formed at the outer end thereof projecting beyond its bore, means whereby the inner member may be drawn into the outer member arranged to cause a wedging action thereof which will contract the bores upon the rods and hold the rods securely in adjusted positions therein, and means slidably mounted in the inner member to discharge the cut blanks when the saw is raised from the shell or other material being cut.

HAROLD E. AXEL.